United States Patent [19]

Bot

[11] Patent Number: 5,419,380
[45] Date of Patent: May 30, 1995

[54] TREE STUMP GRINDER

[76] Inventor: Silvio Bot, 1224 Speers Road, Oakville, Canada, L6L 2X4

[21] Appl. No.: 241,635

[22] Filed: May 12, 1994

[51] Int. Cl.⁶ .............................................. A01G 23/06
[52] U.S. Cl. ...................................... 144/334; 37/302; 144/2 N; 144/208 C; 144/231; 241/101.7; 241/243
[58] Field of Search ............. 37/302; 144/2 N, 208 R, 144/208 C, 218, 231, 329, 334, 359, 363, 369; 241/101.7, 243

[56] References Cited

U.S. PATENT DOCUMENTS

| | | |
|---|---|---|
| 3,389,726 | 6/1968 | Good . |
| 3,685,557 | 8/1972 | Groce . |
| 3,893,633 | 7/1975 | Cox . |
| 4,041,996 | 8/1977 | Grover . |
| 4,180,107 | 12/1979 | Grover . |
| 4,304,275 | 12/1981 | Glover ........................... 144/208 C |
| 4,355,670 | 10/1982 | Ohrberg et al. ...................... 144/334 |
| 4,697,625 | 10/1987 | Bolton . |
| 4,747,260 | 5/1988 | Petrasch et al. .................. 241/101.7 |
| 4,848,423 | 7/1989 | Yoder . |
| 5,115,845 | 5/1992 | Hooser ........................... 144/208 C |
| 5,203,388 | 4/1993 | Bowling . |

FOREIGN PATENT DOCUMENTS 1026652 2/1978 Canada .
1077810 5/1980 Canada .

OTHER PUBLICATIONS

Brochures of Rayco Manufacturing, Inc. entitled: Rayco Hydra-Stumper T175; Spec Data—Rayco T175. Hydrostatic Track-Drive Industrial Stump Cutter—Forestry Mulcher/Mower; Spec Data—Rayco T115.
Hydrostatic Track-Drive Industrial Stump Cutter—Forestry Mulcher/Mower.

*Primary Examiner*—W. Donald Bray
*Attorney, Agent, or Firm*—Riches, McKenzie & Herbert

[57] ABSTRACT

The invention provides a machine for grinding tree stumps to a level below the surface of soil in which the stump is located. The machine comprises a sled structure including lugs for releasably coupling the sled with pivot pins to a moveable boom of a backhoe or other earth moving machine. The sled has skids or skiis for guiding the apparatus over the surface of soil adjacent to the stump with the moveable boom. A drive unit is mounted on the sled having power transmission and a self contained fuel source. A stump grinding wheel is journaled to the sled for rotation about a substantially horizontal axis and coupled to the power transmission of the drive unit. The wheel has a stump abrading surface with replaceable teeth which shred, chip or grind the wood of the stump and dig a trench in the soil approximately 6–9 inches deep. Preferably, the sled comprises a rectangular platform and two elongate skids each extending downwardly from one of two opposing sides of the platform thereby defining an inverted channel shaped sled having a forward and a rearward open end. The grinding wheel is mounted between said skids with the axis transverse to said opposing sides. A guard flap is hinged to the platform covering at least one open end, and the skids have planar inner surfaces to contain the spewing of wood and soil particles caused by the stump grinding operation.

16 Claims, 4 Drawing Sheets

TREE STUMP GRINDER

FIELD OF THE INVENTION

The invention relates to a tree stump grinding apparatus releasably mounted to the moveable boom of earth moving equipment for grinding tree stumps in situ to a level below the surface of soil in which the stump is located.

BACKGROUND OF THE INVENTION

When trees are to be removed from an area of land, often the most difficult part of the process is in dealing with the tree stump. Digging the tree stump out of the soil in which it is located is a time consuming and often unnecessary procedure. Digging destroys the natural meshing together of the soil created by the tree roots which has well known advantages such as in preventing soil erosion. Removal of the top portion of the stump is often all that is necessary. In general, removal to approximately six to twelve inches below the soil surface level is adequate for most purposes. For example, in road construction where the finished road level is four feet or greater above the existing level of topsoil, construction contracts allow the road to be built on top of the organic topsoil with tree stumps removed to existing ground level but leaving the roots intact below the existing ground level.

To remove the top portion of the stump several conventional devices have been produced in the past. Commonly the stump wood material is chipped or shredded with a disk or drum like wheel having wood cutting teeth on its cylindrical face or side surfaces. Such a toothed wheel has been, in previous cases, mounted to the end of a movable machine boom. The boom is moved to various positions in order to chip or shread away the wood material of the tree stump. The rotating wheel often digs into the adjacent topsoil creating a narrow trench or pit while eradicating the stump and roots to a depth of six to twelve inches. After the stump has been shredded or chipped, the wood material can be incorporated into the adjacent topsoil as organic material or may be removed to a separate composting site.

Examples of such conventional stump removing devices are described in U.S. Pat. Nos. 3,685,557 to Groce and to Bowling. The Groce and Bowling devices are mounted on a trailer which is towed behind a truck. Alternatively a dedicated tracked vehicle with a stump removing boom have been produced for use in a similar manner by Rayco Manufacturing Inc. of Wooster, Ohio, U.S.A. and sold under the trade marks RAYCO T115 and RAYCO T175 Hydrostatic Track-Drive Industrial Stump Cutter Forestry Mulcher/Mower.

In addition U.S. Pat. No. 3,389,726 to Good discloses a stump pulverizing apparatus which is hitched to the movable power bar of a conventional farm tractor. The Good apparatus has a platform supported on trailer wheels with an engine and fuel tank mounted to the platform driving an underhung toothed drum to pulverize tree stumps. The drum and platform are moved up and down rotating about the trailer wheel axle, by activating the hydraulic cylinder of the power bar of a convention farm tractor. The stump and adjacent topsoil are gouged out by the teeth of the drum to a depth of approximately twelve inches, whereas the remaining lower stump and root portions are left undisturbed since they do not interfere with normal farming operations.

In recent years, due to increasing consciousness regarding environmental impact of construction activities, constructions contracts are now calling for recycling or composting of tree stump material. For example, in the construction of new highways or building subdivisions, existing trees are cut down and the upper portions of the trees are shredded or chipped for composting or sold for fire wood. In the past it was considered acceptable to dig out stumps with earth moving machinery and burn the stumps on site. Due to air pollution concerns, burning is now considered to be an unacceptable form of disposal.

As an alternative to burning the stumps and other tree materials, it has in the past been considered acceptable to remove the stumps from the construction site and dump them in landfill or municipal garbage landfill sites. Again due to the recent trend in environmental consciousness, the cost of merely dumping stump materials in municipal waste dumps is becoming prohibitively high and in many cases dumps will not accept such wood materials. The rotting of the wood pollutes ground water supplies with humic acid, and as an ecological policy, municipalities refuse many materials which can be recycled or composted. Many municipalities now call for the shredding or chipping of all tree materials including stumps in order that they may be composted or used in grounds maintenance activities of the municipality.

Especially in new road construction, the call for chipping and shredding of numerous tree stumps in construction contracts is creating a demand for high capacity tree stump eradicating machinery. For example, when new roads are constructed through treed areas, the road builders must deal with numerous tree stumps.

The existing organic topsoil, in which trees are located, is generally stripped away and considered only suitable for topsoiling completed roadside areas such as ditches or slopes covered with grass or other vegetation. However, where the finished elevation of the road is four feet or greater above the level of existing organic topsoil, the topsoil need not be removed but may be covered with the compacted earth fill which would build up the roadbase. In such a case, it is only necessary to remove the top portion of the stumps to the level of the topsoil during road construction and to incorporate the chipped stump material into the adjacent organic topsoil.

The conventional devices described above are generally inadequate for roadbuilding applications since commercially available devices are of small size and low capacity designed to remove the odd stump encountered in farming activities and maintenance of parks or other urban areas.

To answer the need for high capacity stump removal devices stump grinding wheels have been conventionally mounted to the boom of a large backhoe excavator. U.S. Pat. Nos. 4,041,996 and 4,180,107 to Grover show a conventional backhoe excavator with a toothed grinding drum mounted to the end of the excavator boom.

The advantage of this type of device is that the backhoe excavator or other earth moving machinery often have tracks or large rubber tires which enable them to traverse over rough terrain encountered in construction activities. The relatively large boom size of a backhoe enables a backhoe operator to remove tree stumps within a large radius of the machine's position without requiring the machine itself to be constantly relocated.

In the above Grover patents the device described is attached to the boom of the backhoe with removable pivot pins. Backhoe booms are conventionally provided with removable pivot pins to quickly attach and detach various implements for construction activities. For example, differently sized or shaped excavator buckets, and pneumatic hammers are commonly connected and easily removed from the excavator boom in this manner. The boom of a backhoe also includes a hydraulic cylinder attached to a linkage mechanism in order to manipulate the implements attached to the end of the boom.

The Grover device however suffers from significant disadvantages and has not been commonly adopted. To minimize the weight and size of the Grover device, the toothed drum is driven by hydraulic motors. The hydraulic motors are attached by hydraulic hoses to the hydraulic system of the backhoe excavator, which is powered by the diesel engine of the backhoe. In such a manner the operator has full control over the operation of the boom and the operation of the toothed wheel from the cab of the backhoe. Hydraulic motors however are very prone to stalling under high load and the practical power which can be delivered to the rotating drum by the backhoe hydraulic system is inadequate to perform the stump grinding operation. Stumps from hardwood trees, or stumps which have grown around rocks require the rotating drum to exert extremely high forces which the applicant has found in practice cannot be delivered by the Grover type of device commercially available.

A further serious disadvantage of conventional stump removing devices including the Grover device is in respect of the vibration, light weight of the stump remover, and kick back of the boom encountered in operation. Such a stump removing device is limited to the power output of the backhoe, since the Grover type stumping device depends on the backhoe hydraulic system for power.

The booms of conventional stump grinding devices are essentially cantilevered structures which are raised and lowered independent of the ground surface upon which the machine or trailer rests. Such cantilevered booms are raised and lowered, and apply downward force during grinding with hydraulic cylinders.

In the case of the Grover apparatus, the boom of a backhoe excavator extends a significant distance from the center of gravity of the machine. When the rotating wheel or drum of the device is engaged with a tree stump, significant vibration occurs due to the cantilevering of the boom, light weight and the relatively slender construction of conventional booms. In particular when stones or other serious obstacles are encountered, the rotating wheel may kick back or lift the boom and attached machinery.

Vibration and kick back therefore represent serious draw backs in the efficient removal of stumps and present significant opportunities for wear and damage to the machinery. Due to these disadvantages the speed at which stumps are removed is seriously limited.

Although the Grover type device attached to the end of a backhoe is considered advantageous in construction activities, the Grover device suffers from the disadvantage that it is required to be connected and disconnected from the backhoe hydraulic system. The connection of hydraulic hoses to the backhoe reduces the size and weight of the stump removing apparatus however it introduces a serious disadvantage in the speed and ease with which the device may be installed and removed from a backhoe.

A common backhoe excavating bucket is removed and installed by merely removing two pivot pins. The Grover device requires the removal of such pins but in addition requires a mechanic to safely disconnect and reconnect high pressure hydraulic hoses. The operator of a backhoe is generally competent to safely remove and reinstall the pivot pins however a significant danger and increased level of skill accompanies the connection and disconnection of high pressure hydraulic hoses. From a practical point of view the backhoe operator must standby while a mechanic disconnects and reconnects the high pressure hydraulic hoses.

In order to maximize the use of the backhoe it may be necessary to disconnect and reconnect the stump grinder numerous times and preferably as quickly as possible. Therefore the requirement of the Grover apparatus to connect and disconnect hydraulic hoses represents a serious limitation on the practical use of such a stump removing device.

Conventional devices also suffer from the disadvantage that the stump shredding or chipping wheels during operation spew soil and wood particles randomly over the work site. The view of the machine operator may be seriously obscured. In addition, flying particles of wood, soil or gravel may create serious safety problems. Conventional devices often include a partial fender or guard over a portion of their circumference to protect the operator. However, due the need to closely observe the progress of the wheel through the stump material it is not practical to completely eliminate the spewing of wood and soil particles in using conventional devices.

It is desirable to produce a stump shredding or chipping device which is capable of the heavy duty demands of road building and other construction activities which can be easily and simply connected and re-connected to various earth moving machines such as a backhoe excavator.

It is also desirable to produce a stump removing device which does not suffer from the problems of vibration and kick back presented by conventional devices which are attached to the end of an unsupported cantilevered boom, and which are limited to the hydraulic power output of a conventional backhoe.

Further it is desirable to contain the spewing of wood and soil particles by the stump removing operation for the safety of the operator and persons working in adjacent areas.

SUMMARY OF THE INVENTION

The invention overcomes the disadvantages of the prior art in a novel manner in the provision of a self-contained apparatus for grinding tree stumps in situ to a level below the surface of soil in which the stump is located.

The invention includes a heavy steel sled structure which is attached by pivot pins only to the boom of a backhoe excavator. The sled includes a platform on which is mounted a motor and fuel tank to drive a grinding wheel. The apparatus is self contained and may be quickly and easily attached and detached from the excavator boom merely by inserting or removing the pivot pins. The sled structure includes skids or skies which are used to guide the apparatus over the ground surface. The backhoe operator draws the sled towards the backhoe using the boom. The grinding wheel excavates a trench six inches to twelve inches in the adjacent soil and when encountering roots or stump material grinds, shreds or chips the wood into a mulch.

Advantageously, the sled structure and skids enable the operator to press the boom down on the sled. Vibration and kick back caused by the rotation of the drum are minimized by supporting and sliding the sled on the ground surface and, if neccessary, holding the sled down with the backhoe boom. However, the weight of the apparatus is substantial such that the operation of the apparatus is not dependant on the force exerted by the backhoe to maintain engagement with the stump and ground surface.

The boom of the backhoe is not subjected to the vibration and kick back encountered with conventional devices since during operation the backhoe boom arches between the sled and the backhoe body, both of which are supported on the ground. During operation, the backhoe boom is used merely to slide the sled along the ground surface and, if neccessary, to press down on the sled to maintain engagement with the ground and the stump. When one stump has been removed, the boom is used to lift and relocate the stump grinding device. The backhoe is relocated by driving over the site on the tractors of the backhoe when the operation is to be continued at a different location.

The stump grinder is of relatively high weight preferrably approaching the maximum capacity of the backhoe device. Since the stump grinder rests on the ground during operation, the backhoe operates merely to slide the sled along the ground surface. Such activity does not approach the maximum capacity of the backhoe excavator. When the stump grinder is lifted, the grinder is not in operation and the maximum capacity of the backhoe may be fully utilized to lift the grinder from one location to another.

In fact, it has been found that the relatively high weight of the self-contained apparatus, including the heavy walled grinding drum which acts as a flywheel, are advantageous features in preventing vibration and kick back during operation. Conventional devices are relatively light weight since they must be held at the end of a cantilevered boom during operation. In contrast the invention provides a sled structure which rests upon the ground. The arched excavator boom is used to hold the grinder securely on the ground surface and to slide the grinder toward the excavator during operation. The combination of high weight and active pressure exerted by the arched backhoe boom produce an extremely stable grinding wheel operation.

If the width of the stump exceeds the width of the grinding wheel, the operator may use additional passes to complete the stump grinding operation. In the embodiment shown the operator merely draws the device towards the backhoe by sliding the sled along the ground surface. It will be understood however that different configurations of sleds and grinding wheels for various applications may be contemplated within the scope of the invention described herein.

In accordance with the invention, a tree stump grinding apparatus is provided comprising: a sled including coupling means for releasably coupling the sled to a moveable boom of an earth moving machine, the sled having skid means for guiding the apparatus over the surface of soil adjacent to the stump with the moveable boom; a drive unit mounted on the sled, having power takeoff means and an energy source; and a grinding wheel journaled to the sled for rotation about a substantially horizontal axis and coupled to the power takeoff means of the drive unit, the wheel having a stump abrading surface.

In a preferred embodiment, the sled comprises a rectangular platform and two elongate skids each extending downwardly from one of two opposing sides of the platform thereby defining an inverted channel shaped sled having a forward and a rearward open end, and wherein the grinding wheel is mounted between said skids with said axis transverse to said opposing sides.

Further aspects of the invention will become apparent upon review of the following detailed description.

BRIEF DESCRIPTION OF THE DRAWINGS

In order that the invention may be readily understood, a preferred embodiment of the invention will be described by way of example with reference to the accompanying drawings in which.

DETAILED DESCRIPTION OF PREFERRED EMBODIMENTS OF THE INVENTION

Figure 1:
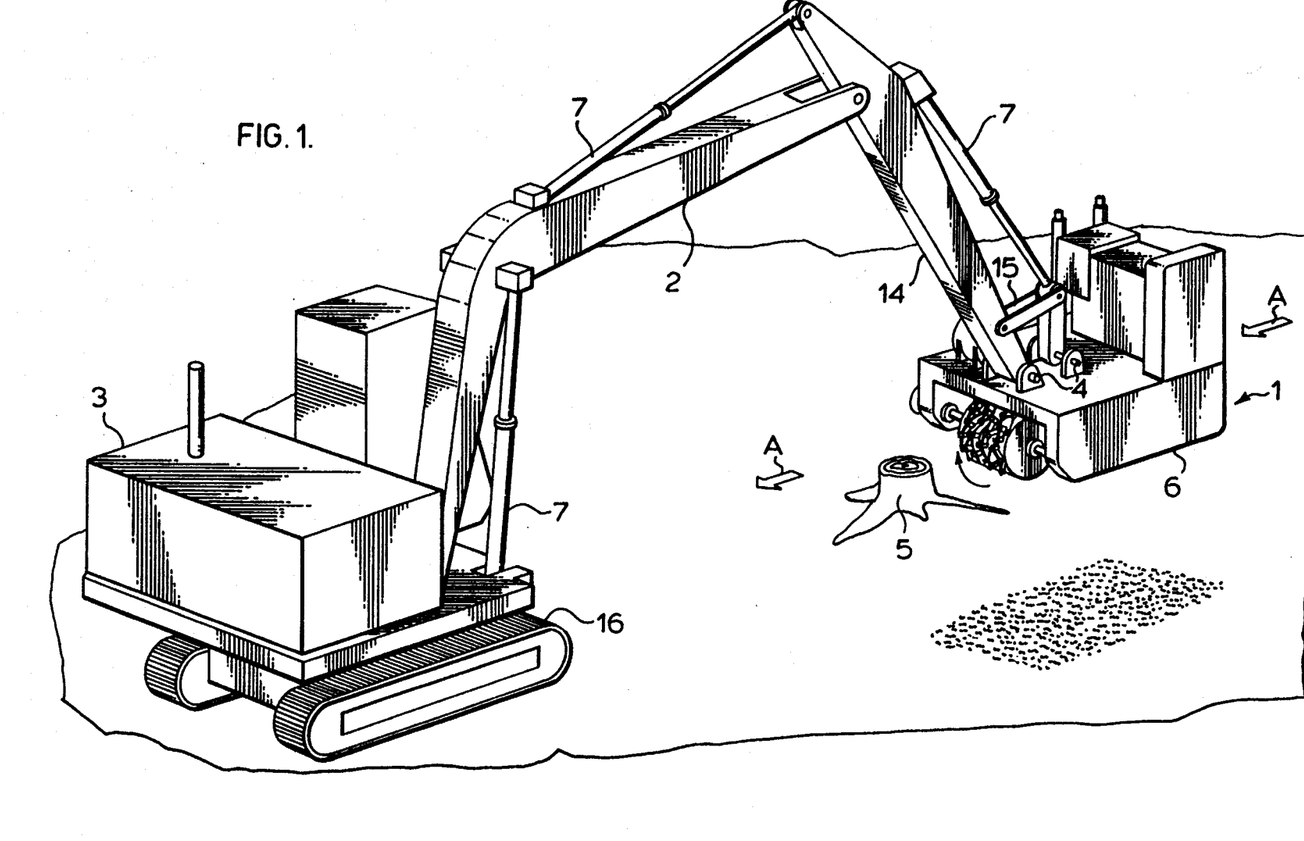
FIG. 1 is a right-side perspective view of the tree stump grinding machine fitted with removable pivot pins to the moveable boom of a conventional backhoe excavator.

FIG. 1 illustrates a preferred embodiment of the invention wherein the stump grinder 1 is connected to the hydraulically operated boom 2 of a backhoe excavator 3. By installing and removing the pivot pins 4, the self contained stump grinder 1 may be connected and disconnected rapidly from the boom 2.

In order to remove a stump 5, to a depth of six to twelve inches below the surface of the soil in which the stump 5 is located, the backhoe operator uses the boom 2 to place the stump grinder 1 on the surface of the ground rearward of the stump 5, as shown in FIG. 1. The stump grinder 1 rests upon the soil on its skids 6 and is drawn in the direction of arrows A toward the backhoe 3. The stump grinder 1 slides on the ground surface upon the skids 6, and the operator, if neccessary, can exert downward pressure on the grinder 1 by manipulation of the hydraulic cylinders 7 of the boom 2.

Figure 2:
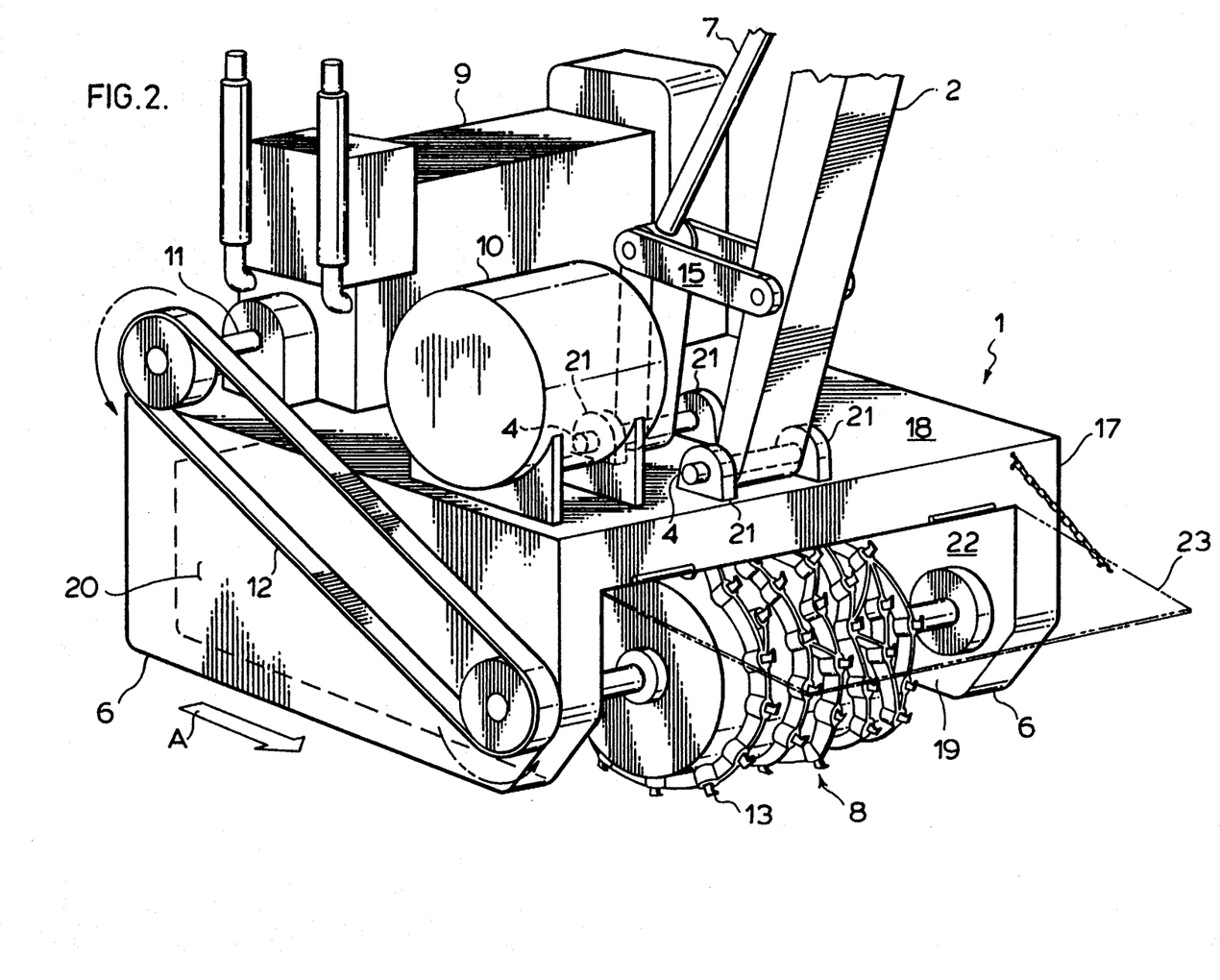
FIG. 2 is a left-side perspective view of the tree stump grinding machine showing only the end portion of the backhoe boom.

As shown in FIG. 2, the stump grinder 1 has a self-contained power unit to rotate a grinding wheel 8. In the embodiment illustrated, the power unit is a diesel motor 9 with accompanying diesel fuel tank 10 as an energy source. Attached to the power take off shaft 11 of the motor 9 is a belt and pulley power transmission system 12 which drives the stump grinding wheel 8. The grinding wheel 8 has a stump abrading surface which contains numerous teeth 13 in a staggered pattern covering the operating width of the wheel 8.

Figure 3:
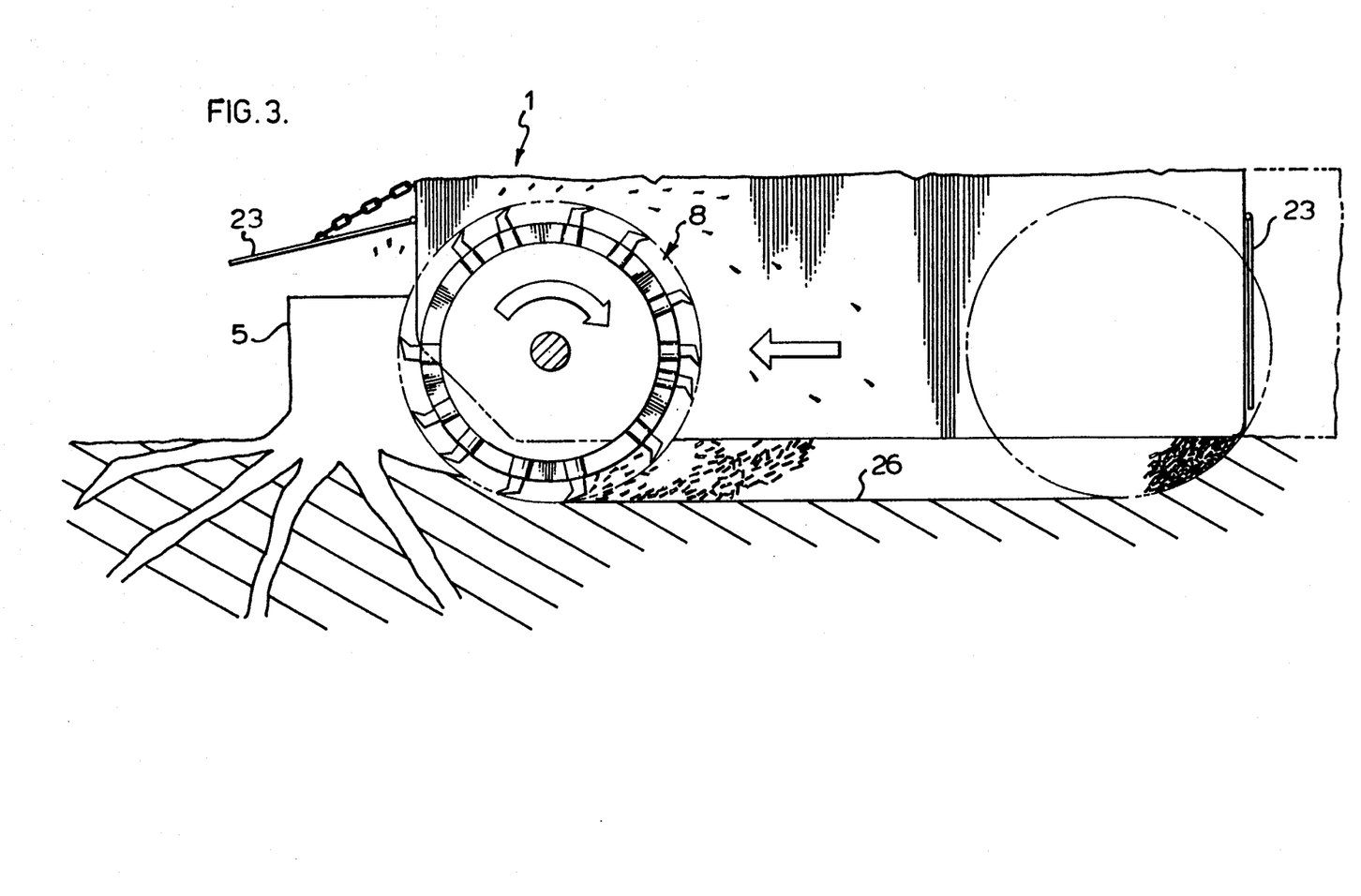
FIG. 3 is a sectional view along the centre-line of the grinding machine, showing the grinding wheel part way through a tree stump and excavating a shallow trench through the adjacent soil.

As best shown in FIG. 3, the sliding motion of the grinder 1 and rotational movement of the grinding wheel initially commence the excavation of a shallow trench 26 in the soil rearward of the stump 5. Continued sliding motion engages the teeth 13 of the grinding wheel 8 with the wood of the tree stump 5.

The clockwise rotation of the grinding wheel 8 engaging the relatively hard material of the stump 5 tends to introduce vibration into the stump grinder 1 due to friction and impact forces between the teeth 13 and the stationary stump 5. The substantial weight of the stump grinder 1 assists in holding the teeth 13 and stump 5 in engagement. However, in addition, downward pressure may be applied advantageously by the boom 2 as the stump grinder 1 is drawn towards the backhoe excavator 3 sliding on the ground surface. The skids 6 prevent the wheel 8 from driving the grinder 1 deeper into the soil.

Where the size of the stump 5 is less than the width of the grinding wheel 8, a single pass is sufficient to completely remove the stump 5. Where the stump 5 is larger than the width of the grinding wheel 8, a series of passes and re-positioning of the stump grinder 1 may be necessary to shred or chip the stump 5. The shredded or chipped stump wood material is incorporated into the adjacent soil by mixing action of the grinding wheel 8. The wood and soil particles spewn by the grinding operation are contained to a local area by the planar side walls of the skids 6 and guard flaps 23.

From the above brief description of operation of the device it will be understood that the skids 6 provide significant advantages over conventional devices. The skids 6 enable the operator to exert downward pressure with the boom 2, secure the boom 2 in an arched configuration reducing vibration and in addition guide the stump grinder 1 over the ground surface ensuring a uniform and minimal depth of cut.

As illustrated, a common configuration of backhoe boom 2 includes a stick 14 with a forward linkage 15. The linkage 15 is hydraulically operated to position any implement which is attached to the end of the boom 2. Accordingly the stump grinder 1 may be oriented to operate on steep slopes above or below the general level on which the backhoe tractors 16 rest.

It is envisioned that the stump grinder 1 will be used on a construction site by first removing the excavator bucket from a backhoe boom 2 and then attaching the backhoe 3 by use of pivot pins 4 to the stump grinder 1 when required. The backhoe 3 may move about the construction site on its tractors 16 and may remove stumps from a relatively large diameter area by spinning the backhoe 3 about its vertical axis.

Although a backhoe excavator 3 is foreseen as the preferred earth moving machine to be used, due to the relatively long reach of the backhoe boom 2, it will be understood that the stump grinder 1 may be easily adapted for use with booms of other common earth moving machines. For example, the lifting arms of a front end loader or bulldozer may equally serve as the movable boom or a specific dedicated machine with an arm for lifting and pushing may be designed for use dedicated to stump removal. However due to the relatively long reach of a backhoe excavator and the ease with which such a common construction machine may negotiate about on rough terrain, the preferred embodiment shown in the drawings and described herein relates to a backhoe excavator 3. Although the drawings and description herein are directed to a backhoe with tracks, it will be understood that conventional rubber tired earth moving machines may be used to equal advantage.

The details of the construction and operation of the stump grinder 1 are described below. Referring to FIG. 2, the invention provides an apparatus for grinding tree stumps in situ to a level below the surface of the soil in which the stump is located. The stump grinder 1 includes a sled structure 17 upon which other components are mounted and which enables the boom 2 to be used to slide the sled 17 along the ground surface in the direction of arrow A.

In the embodiment illustrated, the sled 17 comprises a rectangular upper platform 18 and two elongate skids 6 which extend downwardly from two opposing sides of the platform 18. The platform 18 and skids 6 therefore define an inverted channel shaped sled 17 having a forward open end 19 and a rearward open end 20. The grinding wheel 8 is mounted between the skids 6 and is journaled for rotation about a substantially horizontal axis transverse to the skids 6. The grinding wheel 8 is coupled to the power take off shaft 11 of the diesel motor drive unit 9 by the belt and pulley power transmission means 20. The diesel motor drive unit 9 and all associated components such as the diesel fuel tank 10 are mounted on the sled 17 to provide a self-contained stump grinding unit. It will be apparent that any other conventional drive unit may be used to equal advantage such as an electric motor with batteries as an energy source for example.

The sled 17 includes coupling means for releasably coupling the sled 17 to the movable boom 2 of an earth moving machine such as a backhoe 3. As illustrated the coupling means comprise two pairs of lugs 21 mounted to the platform 18 of the sled 17. Each pair of lugs 21 includes a through bore for securing an associated pivot pin 4 of the boom 2.

Figure 4:
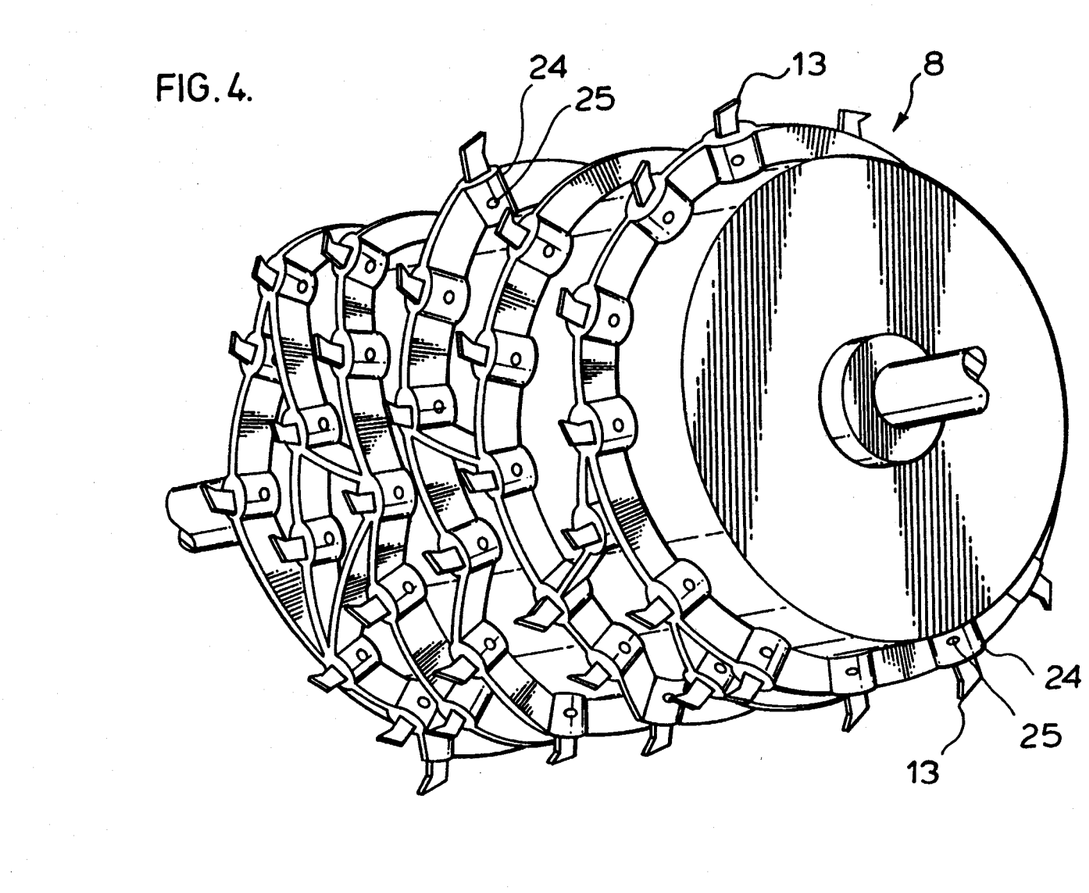
FIG. 4 is a detail perspective view of the grinding wheel showing the staggered spacing of removable shredding teeth installed in the stump abrading surface of the wheel.

In the embodiment illustrated the grinding wheel 8 comprises a hollow steel drum having a cylindrical outer drum wall studded with stump abrading teeth 13. The drum wall includes means for releasably mounting the removable teeth 10 in the form of cylindrical pockets 24 into which the shank of the removable teeth 13 is inserted and secured with a lock bolt 25. Such pockets 24 and removable teeth 13 are commonly used in mining and tunneling equipment to bore through rock surfaces. An advantage of using mounting pockets and removable teeth 13 results not only from the ability to quickly repair broken teeth but in the ability to change the teeth depending on the preference of the user. For example wood shredding teeth, wood chipping teeth, scrapping teeth or other configurations may be used individually or in combination depending on the preferences of the user. Since roots often grow around rocks, use of rock boring teeth 13, such as used in mining applications may be used as well.

It has been found that in designing the drum 8 as a fly wheel with a high moment of inertia is advantageous to maintain the uniformity of drum rotation in operation. To this end the drum 8 is preferably be made of steel with a cylindrical outer a wall at least two inches thick which provides the rotational inertia required for smooth operation. The layout of teeth 13 and pockets 24 must of course result in a balanced weight distribution for optimal operation and bearing life, as well as an axial and radial spacing of teeth 13 that provides cutting capacity over the entire surface of the drum 8.

A prototype has been developed wherein the drive unit is an internal combustion diesel engine having an output of at least 200 horse power, preferably 300 HP, and including power transmission capable of rotating the drum at a constant speed of over 400 rpm, preferrably 500 rpm. The total weight of the prototype is in approximately 5 tons. It has been found through experiment that the high weight of the stump grinder 1 combined with the designated rotating speed of the drum 8 and high inertial force under rotation, combine to produce an extremely smooth and substantially vibration free operation. Teeth were spaced axially ⅛ to ¼th inch apart and teeth were staggered radially and axially to ensure that the complete drum was adequately balanced.

Vibration and kick back are significantly reduced by exerting pressure on the sled 17 with the hydraulic boom 2 in an arched configuration. It will be understood that the bearing surfaces of the skids 6 engage with the soil adjacent the stump 5 to stabilize the boom 2 and minimize conduction of vibrations.

A further advantage in the use of skids 6 is where skids 6 include planar inner walls 22 adjacent to the wheel 8. As shown best in FIG. 3 and for clarity in dashed outline in FIG. 2, the sled 17 preferably includes at least one movable guard flap 23 covering the open ends 19 and 20 the sled 17. The movable guard flaps 23 are hinged to the sled 17 and in combination with the planar inner walls 22 of the skids 6 substantially confine the spewing of soil and wood particles caused by the stump grinding operation.

As described above the invention has significant advantages when compared to conventional stump grinders. The use of skids 6 reduces the problem of vibration and kick back and enables the operator to hold the device down against the adjacent soil by exerting pressure with the hydraulic boom 2 in an arched configuration. The relatively high weight of the stump grinder 1 approaches the capacity of the backhoe excavator 3 preferably. The high weight assists in reducing vibration and aids in exerting pressure on the stump during operation.

Although the above description is directed to use of the invention in construction activities such as new road construction, it will be apparent that the invention may be used to remove stumps in logging operations, tree farm maintenance, or maintenance of parks and urban areas.

This disclosure has described and illustrated certain preferred embodiments of the invention, however it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. An apparatus for grinding tree stumps in situ to a level below the surface of soil in which the stump is located, said apparatus comprising:
   a sled including coupling means for releasably coupling the sled to a moveable boom of a vehicle, the sled having skid means for guiding the apparatus over the surface of soil adjacent to the stump with the moveable boom;
   a drive unit mounted on the sled; and
   a grinding wheel journaled to the sled for rotation about a substantially horizontal axis and coupled to the drive unit, the wheel having a stump abrading surface,
   wherein the sled comprises a rectangular platform and two elongate skids each extending downwardly from one of two opposing sides of the platform thereby defining the sled as an inverted channel having a forward and a rearward open end, and wherein the grinding wheel is mounted between said skids with said axis transverse to said opposing sides.

2. An apparatus according to claim 1 wherein the drive unit is a self contained prime mover including a dedicated source of energy.

3. An apparatus according to claim 1 wherein the drive unit is mounted on an upper surface of the platform.

4. An apparatus according to claim 1 wherein the skids include planar inner walls adjacent the wheel.

5. An apparatus according to claim 1 wherein the sled includes a moveable guard flap covering one open end of the sled.

6. An apparatus according to claim 1 wherein the grinding wheel comprises a hollow drum having a cylindrical outer drum wall, said drum wall including stump abrading teeth.

7. An apparatus according to claim 6 wherein the drum wall includes means for releasably mounting removable teeth.

8. An apparatus according to claim 7 wherein the teeth are selected from the group consisting of: shredding teeth; chipping teeth; and scraping teeth.

9. An apparatus according to claim 6 wherein the drum is made of steel, and the drum wall is at least two inches thick.

10. An apparatus according to claim 1 wherein the coupling means comprise two pairs of lugs mounted to the sled, each pair of lugs including means for securing an associated pivot pin of the boom.

11. An apparatus according to claim 1 wherein the drive unit comprises an internal combustion engine and power transmission capable of rotating the drum at over 400 r.p.m.

12. An apparatus according to claim 11 wherein said engine has an output of at least 200 horsepower.

13. An apparatus according to claim 1 of total weight in excess of 4 tons.

14. A method of grinding tree stumps in situ to a level below the surface of soil in which the stump is located comprising the steps of:
   releasably coupling a stump grinder to a forward end of a boom of a vehicle, the stump grinder comprising: a sled including coupling means for releasably coupling the sled to a moveable boom of the vehicle, the sled having skid means for guiding the apparatus over the surface of soil adjacent to the stump with the moveable boom; a drive unit mounted on the sled; and a grinding wheel journaled to the sled for rotation about a substantially horizontal axis and coupled to the drive unit, the wheel having a stump abrading surface, wherein the sled comprises a rectangular platform and two elongate skids each extending downwardly from one of two opposing sides of the platform thereby defining the sled as an inverted channel having a forward and a rearward open end, and wherein the grinding wheel is mounted between said skids with said axis transverse to said opposing sides;
   lifting the grinder with the boom to a starting position wherein the skids rest on the soil surface rearward of the stump to be removed;

simultaneously rotating the grinding wheel and operating the boom to rearwardly slide the sled on the soil surface in the direction of the vehicle to engage the grinding wheel with the stump.

15. A method according to claim 14 wherein, during the step of sliding the sled, the boom is operated to exert downward force on the sled.

16. A method according to claim 14 wherein the grinding wheel is rotated at no less than 400 r.p.m.

* * * * *